United States Patent [19]

Schindler

[11] Patent Number: 4,721,757
[45] Date of Patent: Jan. 26, 1988

[54] VINYL MONOMER COMPOSITIONS WITH ACCELERATED SURFACE CURE

[75] Inventor: Frederick J. Schindler, Fort Washington, Pa.

[73] Assignee: Rohm and Haas Company, Philadelphia, Pa.

[21] Appl. No.: 888,090

[22] Filed: Jul. 17, 1986

Related U.S. Application Data

[63] Continuation of Ser. No. 669,699, Nov. 8, 1984, abandoned.

[51] Int. Cl.$^4$ ............................................... C08F 4/00
[52] U.S. Cl. ...................................... 525/245; 525/248; 525/289; 525/290; 525/302
[58] Field of Search ................. 525/245, 248, 289, 290

[56] References Cited

U.S. PATENT DOCUMENTS

| | | | |
|---|---|---|---|
| 3,461,188 | 8/1969 | Baer | 525/290 |
| 3,642,750 | 2/1972 | Wegemund et al. | 525/290 |
| 3,671,610 | 6/1972 | Amagi et al. | 525/303 |
| 3,775,514 | 11/1973 | Amagi et al. | 525/303 |
| 3,962,198 | 6/1976 | Wada et al. | 525/290 |
| 4,048,259 | 9/1977 | Wegemund et al. | 525/290 |
| 4,145,503 | 3/1979 | Emmons et al. | 525/290 |
| 4,287,317 | 9/1981 | Kitagawa et al. | 525/290 |
| 4,319,009 | 3/1982 | Friedli et al. | 525/290 |

FOREIGN PATENT DOCUMENTS 0100168 6/1982 Japan ................................... 525/290

*Primary Examiner*—Joseph L. Schofer
*Assistant Examiner*—J. M. Reddick
*Attorney, Agent, or Firm*—Carl W. Battle; Douglas E. Winters

[57] ABSTRACT

This invention relates to vinyl monomer compositions exhibiting accelerated surface cure characteristics. These compositions are prepared from a vinyl monomer or monomer mixtures such as a blend of dicyclopentenyloxyethyl methacrylate and hydroxypropyl methacrylate, a bulk phase polymerization catalyst system, a polyvalent metal oxidative surface phase catalyst, and a diolefin rubber dispersed in the vinyl monomer as a surface cure accelerator. These compositions are useful as binders for polymer concrete and as impregnants for porous surfaces. The accelerated surface cure is particularly advantageous with monomer mixtures containing low volatility vinyl monomers.

23 Claims, No Drawings

VINYL MONOMER COMPOSITIONS WITH ACCELERATED SURFACE CURE

This application is a continuation of application Ser. No. 669,699, filed Nov. 8, 1984, now abandoned.

BACKGROUND OF THE INVENTION

1. Field of the Invention

This invention relates to vinyl monomer compositions exhibiting accelerated surface cure characteristics. These compositions are prepared from a vinyl monomer or monomer mixture, such as a blend of dicyclopentenyloxyethyl methacrylate and hydroxypropyl methacrylate, a bulk phase polymerization catalyst system, a polyvalent metal oxidative surface phase catalyst, and a diolefin rubber dispersed in the vinyl monomer as a surface cure accelerator. These compositions are useful as binders for polymer concrete and as impregnants for porous surfaces. The accelerated surface cure is particularly advantageous with monomer mixtures containing low volatility vinyl monomers.

2. Brief Description of the Prior Art

Vinyl monomer compositions which are polymerized in situ to form protective coatings are well known. For example, methyl methacrylate compositions have been widely studied as impregnants or sealers for concrete, and as binders for aggregate-filled "polymer concrete" composition useful for coating or patching portland cement based concrete. Typically, the substrate is pretreated to enhance penetration of monomer and the impregnated or coated substrate is cured in a subsequent polymerization step. Concrete treated in this manner can be more resistant to abrasion and chemical spills than untreated concrete. Vinyl monomer may be polymerized in bulk by free radical polymerization initiated by high energy radiation, particle beams or chemical sources of free radicals such as peroxides and hydroperoxides. On the other hand, it is well known that free radical polymerization of vinyl monomers may be inhibited by molecular oxygen. The effect of oxygen inhibition on polymerization becomes particularly troublesome in surface coating and impregnant compositions, such as those used in protecting concrete surfaces. In the special case of compositions based on methyl methacrylate, the lack of surface cure is not particularly disadvantageous. Methyl methacrylate has significant vapor pressure and uncured monomer on the surface of an otherwise polymerized composition volatilizes relatively quickly, exposing the hard polymeric surface beneath.

However, when the uncured composition contains less volatile vinyl monomer, the surface of composition which has been cured in bulk may be very slow to cure because of oxygen inhibition. The results in a surface with such undesirable properties as tack and persistent residual odor. Compositions containing low volatility monomers may be otherwise desirable because of enhanced chemical resistance, greater safety, low odor and other properties which such monomers confer when polymerized. Under-cured oligomeric material on the surface may increase the water sensitivity.

A variety of techniques have been used in an attempt to solve the problem presented by inhibition of polymerization by oxygen. For example, a polyvalent metal salt such as zinc naphthenate may be included in the coating or impregnant composition in order to catalyze the oxidative cure of the residual uncured monomer. Driers such as zinc naphthenate are commonly used to promote through-drying of alkyd paints. In addition, in a manufacturing context, articles coated with vinyl monomer composition can be cured under a blanket of nitrogen or other inert gas. Alternatively, a second coating of a material such as paraffin, which reduces oxygen penetration at the surface of the applied vinyl monomer, can also be used to ameliorate the situation. The paraffin can be included with a blend of volatile monomers to yield a surface film on application. Alternatively, a second film of paraffin can be applied over the initial coating film. None of these solutions to the problems arising from oxygen inhibition of surface cure has been totally satisfactory, and there remains a significant need for vinyl monomer compositions which rapidly develop surface cure, especially in the case of compositions which contain low volatility vinyl monomers.

SUMMARY OF THE INVENTION

It is an object of this invention to provide vinyl monomer compositions which have a surface which cures more quickly than prior art compositions when the surface of the vinyl monomer composition is exposed to oxygen. The compositions of this invention have the advantage of yielding surface coatings which show reduced tack compared with prior art compositions. Another advantage is that the compositions of this invention may be formulated using a greater proportion of low volatility monomer to achieve a relatively tack-free surface than prior art compositions. Still another advantage lies in the improved surface physical properties shown by the compositions of this invention in comparison with prior art compositions. These improved surface physical properties are reflected, for example, in the resistance to chalking and color fading shown by surfaces coated with compositions of this invention. Another advantage is that thinner coatings of the compositions of this invention can be used to achieve the same level of performance as that of prior art compositions. These and other objects and advantages which will become apparent below are met by this invention, which is a vinyl monomer composition exhibiting improved cure in an oxygen-containing environment comprising a deinhibiting amount of diolefin rubber dispersed in vinyl monomer including at least one low volatility vinyl monomer, wherein said diolefin rubber is insoluble in said vinyl monomer, and at least one polyvalent metal catalyst.

DETAILED DESCRIPTION OF THE INVENTION

The compositions of this invention are comprised of a deinhibiting amount of diolefin rubber dispersed in vinyl monomer, including at least one low volatility vinyl monomer, wherein the diolefin rubber is insoluble in the vinyl monomer, and at least one polyvalent metal catalyst. It has been found that surface vinyl monomer compositions which contain diolefin rubber dispersed therein cure significantly more quickly than similar compositions which do not contain the dispersed diolefin rubber. Further, compositions of this invention containing diolefin rubber particles show an accelerated surface cure in comparison with analogous compositions which have nonolefin rubber polymeric particles dispersed instead of the olefin rubber particles. The acceleration of the surface cure of the vinyl monomer by the diolefin rubber is unexpected and the mechanism of acceleration is unknown.

The diolefin rubber is preferably present in the composition in the form of dispersed particles. The diolefin rubber may be in the form of a homopolymer of diolefin monomer or as a copolymer of diolefin monomers. Alternatively, copolymers of diolefin monomer and copolymerizable nondiolefin monomer may be employed. Examples of diolefin monomers which may be used to prepared diolefin polymer are 1,3-butadiene, 2-chloro-1,3-butadiene, 2,3-dichloro-1,3-butadiene, 2-cyano-1,3-butadiene 1,2,3,4-tetrachlorobutadiene, isoprene, 1,4-hexadiene and dicyclopentediene. Diolefin rubber particles polymerized from monomer comprising at least about 60 percent by weight of total monomer selected from 1,3-butadiene, 2-chloro-1,3-butadiene, 2,3-dichloro-1,3-butadiene, 2-cyano-1,3-butadiene, 1,2,3,4-tetrachlorobutadiene, isoprene, 1,4-hexadiene and dicyclopentadiene are preferred. Homo- and copolymers of 1,3-butadiene are preferred. The diolefin rubber particles may be prepared by emulsion or suspension polymerization, as is conventional in the rubber art. In addition, natural rubber latex may be used. Diolefin rubber particles which are insoluble yet swellable in the vinyl monomer are preferred. Thus, internally crosslinked diolefin rubber particles are preferred. The diolefin rubber particles must also be dispersible in the vinyl monomer. Polymer dispersion aids may be employed to disperse the diolefin rubber particles in the vinyl monomer. The diolefin rubber particles may be prepared by emulsion polymerization in multiple stages. It is preferred that at least a portion of the monomer used in the second and/or later stages of polymerization be selected to yield polymeric material which is compatible with the vinyl monomer employed in the composition of this invention. For example, when the vinyl monomer composition contains dicyclopentenyloxyethyl methacrylate, the monomer used in the second stage of emulsion polymerization in the preparation of the diolefin rubber particles may be methyl methacrylate. The second and/or later stages may be graft polymerized to the first. Especially preferred are diolefin rubber particles disclosed in U.S. Pat. Nos. 3,671,610, 3,775,514 and 3,899,547; hereby incorporated by reference. These patents disclose processes for preparing butadiene-styrene-methyl methacrylate copolymers by graft polymerizing, on crosslinked butadiene or polybutadiene-styrene copolymer latex, styrene, methyl methacrylate and copolymerizable crosslinking agent. Other diolefin rubbers prepared by emulsion or suspension polymerization, such as chloroprene nitrile-butadiene rubber, and styrene-butadiene rubber, may also be modified by graft polymerization of similarly compatible monomers to yield diolefin rubber particles which are dispersible in the vinyl monomer compositions of this invention. It is believed that such modified diolefin rubber particles have a core-shell structure, and that the shells of these particles, comprising copolymer compatible with the monomer, swell and/or partially dissolve in the monomer, thereby promoting dispersion of the particles in the monomer. However, this invention is not limited by the proffered explanation of the dispersion of these particles, and further, any means of dispersing diolefin rubber particles in the monomer may be used to prepare the compositons of this invention. Preferred later stage monomers include styrene, methyl methacrylate, and the ($C_2$–$C_8$)alkyl acrylates. The initial stage monomer and the later stage monomer may include from about 0.01 to 5 percent by weight of total monomer which is polymerized in the initial stage or later stage, respectively of divinyl crosslinking agent. The divinyl crosslinking agent may be selected from divinyl benzene, diethylene glycol dimethacrylate, triethylene glycol dimethacrylate, tetraethylene glycol dimethacrylate, polyethylene glycol dimethacrylate, polypropylene glycol dimethacrylate and 1,3-butylene glycol dimethacrylate.

It is preferred that the weight ratio of the diolefin rubber particles to the vinyl monomer be from about 1:20 to 1:1. It is especially preferred that this weight ratio be from about 1:9 to 1:4. It is preferred that the ratio of the weight of diolefin monomer polymerized to yield the diolefin rubber particles to the total weight of monomer polymerized to yield these particles be at least about 0.4.

Turning now to the vinyl monomer within which the diolefln rubber is dispersed, while the vinyl monomer may consist of a single monomeric species, the vinyl monomer may also be made up of a mixture of vinyl monomer species. By "vinyl monomer species" is meant an alpha, beta-ethylenically unsaturated monomer species. The monomer species may have only one site of alpha, beta-ethylenic unsaturation, or it may have two or more such sites. Low volatility vinyl monomer species are preferred, but the vinyl monomer may also contain other more volatile vinyl monomer species, such as methyl methacrylate. "Low volatility vinyl monomer species" means an alpha, beta-ethylenically unsaturated monomer species having a partial pressure of less than about 1 mm of Hg at 50° C. Examples of low volatility vinyl monomer species are t-butyl styrene, which has a partial pressure of 1 mm at 47° C., and 2-ethylhexyl acrylate, which has a partial pressure of 1 mm at 50° C.

In addition to the diolefin rubber and low volatility vinyl monomer, compositions of the present invention must also contain at least one polyvalent metal catalyst to promote the oxidative cure of the vinyl monomer. Polyvalent metal oxidative cure catalysts are well known in the coatings art. The polyvalent metal oxidative cure catalyst may be any salt or complex of a polyvalent metal ion that catalyzes the oxidative curing of drying oils and, when added to oil-based varnishes and paints, hastens the drying or curing thereof. These metal salts or complexes are also known, in the art, as "siccatives" or "driers". Such substances include the polyvalent metal salts of higher aliphatic acids, such as the butyrate, pentanoate, hexanoate, and especially the salts of higher aliphatic acids having from 8 to 30 carbon atoms or of naphthenic acids that provide solubility in the vinyl monomer. Generally, the most useful drier salts for the vinyl monomer compositions of the present invention are salts of naphthenic acids or of ($C_8$–$C_{30}$)aliphatic acids. Examples of the polyvalent metal include calcium, copper$^{II}$, zinc$^{II}$, manganese$^{II}$, manganese$^{III}$, lead$^{II}$, cobalt$^{II}$, iron$^{III}$, vanadium$^{II}$, and zirconium$^{IV}$. These salts or complexes accelerate the action of the organic hydroperoxide and promote oxidative curing in the organic peroxide-amine catalyst system. Other examples of the acid component or anion of the drier salt are those of resinic acids, (that is, rosin acids), tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid, and abietic acid. A mixture of drier salts may be used.

Preferred polyvalent metal catalysts are the transition metal and alkaline earth naphthenates, octoates, and acetylacetonates. Especially preferred drier salts are those of cobalt, vanadium and manganese, such as cobalt octoate, cobalt naphthenate, cobalt acetylacetonate, managanese octoate, manganese naphthenate, and manganese acetylacetonate and vanadium acetylacetonate. Para-dimethylamino benzaldehyde may be used with drier salts to enhance surface cure, and compositions containing p-dimethylamino benzaldehyde and cobalt salts are preferred.

The compositions of the present invention are very useful as surface coatings for a variety of substrates. This invention permits the application of coatings with less thickness than previous practical applications because of the surface cure acceleration. While nonporous substrates which can be wet out with the vinyl monomer composition can be coated, these vinyl monomer compositions are particularly useful for impregnating and/or sealing porous surfaces such as concrete. In addition, the vinyl monomer composition may be filled with sand, aggregate or other filler to yield polymer concrete compositions. These may be used for a variety of purposes, such as repairing damaged or weathered exterior concrete on structures and roads, bridge deck repair, new floor surfaces for industrial plants, and the like.

When the compositions of this invention are used for sealing or impregnating porous surfaces, or when they are used to prepare polymer concrete compositions, preferred monomer species are dicyclopentenyloxy($C_2$–$C_6$)alkyl acrylates and the corresponding methacrylates, dicyclopentenyl acrylate and the corresponding methacrylate, and hydroxy($C_1$–$C_4$)alkylacrylates and hydroxy($C_1$–$C_4$)alkylmethacrylates. Flexibility enhancing monomers which are preferred are the ($C_8$–$C_{16}$)alkyl acrylates and ($C_8$–$C_{16}$)alkyl methacrylates. Multifunctional monomers which are preferred are the diacrylates, triacrylates, dimethacrylates and trimethacrylates. Dicyclopentenyl acrylate, dicyclopentenyl methacrylate, dicyclopentenyloxy($C_2$–$C_6$)alkyl acrylates, and dicyclopentenyloxy($C_2$–$C_6$)alkyl methacrylates may be referred to collectively as "dicyclopentenyl" monomers. Hydroxy($C_1$–$C_4$)alkyl acrylates and hydroxy($C_1$–$C_4$)alkyl methacrylates may be referred to collectively as "hydroxyalkyl" monomers. It is preferred that the vinyl monomer of this invention contain from about 25% to 75% by weight of total vinyl monomer of dicyclopentenyl monomer and from about 75% to 25% by weight of total vinyl monomer of hydroxyalkyl monomer. It is also preferred that the vinyl monomer contain from about 2% to 20% by weight of total vinyl monomer of multifunctional monomer. It is preferred that the vinyl monomer contain from about 2% to 35% by weight of the total monomer of the flexibilizing monomer. Especially preferred dicyclopentenyl monomers are dicyclopentenyloxyethyl methacrylate, dicyclopentenyl acrylate and dicyclopentenyl methacrylate. Especially preferred hydroxyalkyl monomers are hydroxyethyl methacrylate and hydroxypropyl methacrylate. An especially preferred multifunctional monomer is tetraethyleneglycol dimethacrylate. Especially preferred flexibilizing monomers are lauryl methacrylate and isodecyl methacrylate.

In using the compositions of this invention as surface coatings and impregnants, and as polymer concrete binders, and in similar applications, it is necessary to provide some additional means of polymerizing the bulk of the vinyl monomer which is not sufficiently close to the surface of the composition to be effectively cured by the surface cure catalyst provided. The bulk may be polymerized by any of the methods which are known in the art as useful for polymerization of vinyl monomers. For example, the bulk may be cured by free-radical polymerization. The free-radicals may be generated by thermal decomposition of an initiator species dispersed or dissolved in the composition or they may be generated by exposing the composition to high energy radiation such as gamma radiation. Alternatively, in the case of a relatively thin coating, a particle beam may be applied to the composition, such as an electron beam. If an initiator species is employed, it may be used as an element of a polymerization catalyst system. For example, it may be used as part of an oxidation radiation catalyst system. The polymerization catalyst system may initiate and/or catalyze the polymerization of the vinyl monomer employed in the compositions of this invention. Multiple catalysts and/or initiators may be employed simultaneously.

Among the free-radical initiator species which may be used are the organic peroxides and hydroperoxides. The organic peroxides and hydroperoxides that may be used include the peroxides and the hydroperoxides derived from hydrocarbons which contain from about 3 to 18 carbon atoms so that they are soluble in the vinyl monomer composition. Suitable organic hydroperoxides include tertiary-butylhydroperoxide, cumene hydroperoxide (CHP), methyl ethyl ketone hydroperoxide and diisopropylbenzene hydroperoxide. Suitable peroxides include benzoyl peroxide (BPO), tertiary-butyl-perbenzoate, 2,2-bis-(tert-butylperoxy)-butane peroxide, bis-(1-hydroxy-cyclohexyl)-butane peroxide, and tert-butylperoxy isopropyl carbonate. Preferred free radical initiators are cumene hydroperoxide and benzoyl peroxide.

A more preferable polymerization catalyst is a mixture of an organic peroxide and an aromatic amine. An especially preferable polymerization catalyst is a mixture of benzoyl peroxide and N,N-dimethyl p-toluidine.

Aromatic amines may be used in small amounts with the organic peroxides and generally accelerate the action of the peroxide. For example, aniline, N,N-dimethylaniline, N,N-diethylaniline, toluidine, N,N-dimethyl p-toluidine, N,N-di(hydroxyethyl)toluidine, and p-dimethylaminobenzaldehyde may be added for this purpose in an amount of about 0.1 to 5 percent by weight of the vinyl monomer composition. Para-dimethylamino benzaldehyde is preferred, especially when used in connection with a polyvalent metal oxidative cure catalyst such as cobalt naphthenate. Para-aminobenzaldehyde enhances the surface cure provided by cumene hydroperoxide initiator and is preferred.

The addition of a polyvalent metal salt or complex, preferably with an organic hydroperoxide, in small amounts, can be made to the vinyl monomer composition prior to use. The proportion of metal salt or complex added to the composition before use may be from 0.0005 weight percent up to about 2 weight percent, and the amount of hydroperoxide may be in the range of 0.1 to 3 weight percent, based on the total weight of the monomers.

Similarly, the addition of an organic peroxide, with an aromatic amine accelerator, and polyvalent metal salt or complex, can be made to the vinyl monomer composition prior to use. The proportion of the organic peroxide to the composition may be in the range of about 0.1 to 3 weight percent and the aromatic amine accelerator is used in an effective amount, usually in the range of about 0.1 to 5 weight percent.

The polyvalent metal salt or complex and hydroperoxide, or the aromatic amine accelerator, and peroxide and polyvalent metal salt or complex, may be kept in separate packages and shipped separately to the site of operations where the respective components may be combined and where the composition of the present invention is to be used, as by pouring to impregnate a concrete floor, base, or pavement. Alternatively, the aromatic amine accelerator and vinyl monomer composition may be combined in a package for storing and shipping prior to combining them with the organic peroxide before using the composition.

The composition may be colored by a suitable amount of pigment or dye dissolved in the vinyl monomer composition. The amount of such pigment or dye may vary from about 1% to 10% by weight of the composition.

The compositions of this invention may additionally comprise a minor amount of at least one drying oil. Examples of drying oils which may be employed in the compositions of this invention include tung oil, linseed oil, soybean oil, isomerized linseed oil, soy oil, safflower oil, sunflower seed oil, caster oil, and tall oil.

The compositions of this invention may in addition comprise a solvent for the vinyl monomer. The solvent may be used in an amount effective to reduce the viscosity of the vinyl monomer in order to increase the rate and depth of penetration of the composition into the substrate when the vinyl monomer composition is used as an impregnant. Solvents which are both volatile and polar are preferred. The addition of a solvent or solvent mixture to the vinyl monomer may also be useful when it is necessary to achieve a viscosity within a specific range for other purposes. For example, when the mode of application of the composition is by spray, a low viscosity is often desirable in order to speed the application process and make efficient use of the application equipment employed. Examples of solvents which may be used are methanol, ethanol, butanol, xylene, mineral spirits, or methyl amyl ketone.

The compositions of this invention may additionally comprise a stabilizer or monomer inhibitor such as a ketoxime stabilizer or hydroquinone as an inhibitor. In addition, other well known adjuvants can be included in the compositions of the invention including, for example, antioxidants and antiozonidants and flow control agents.

In order to further accelerate the surface cure of the compositions of this invention, they may additionally comprise a minor amount of photoactive compound selected from benzophenone, and benzophenone derivatives of the formula $C_6H_5C(O)C_6H_4R$; where R is selected from 4—$CH_3$, —OH, —$NH_2$, —Cl, —$CO_2H$, —$CO_2CH$; 2—$CO_2H$, —$CO_2CH_3$, —$NH_2OH$; and —3—$NO_2$, —$CO_2H$ and —$CO_2CH_3$. The photoactive compound is also useful in promoting the cure of the surface of the compositions of the present invention, when applied to exterior surfaces.

It is understood that commercial grade hydroxyethyl methacrylate and hydroxypropyl methacrylate monomers may be used and that, as is known in the art, such commercial grade monomers generally contain about 90% and 92%, respectively, of the desired ester product, the balance to 100% being high boiling methacrylate compounds, methacrylic acid, dimethacrylate compounds and the corresponding alkylene oxide.

The compositions described hereinabove may be hard and tough when cured. When it is desired to render such compositions more flexible, a small proportion of a drying oil, such as linseed oil, as described above, or of an acrylic polymer having a low glass transition temperature ($T_g$), such as poly(ethylacrylate), poly(butylacrylate), or poly(2-ethylhexylacrylate), or a mixture of a drying oil and low Tg acrylic polymer, may be added to the composition and may replace part of the vinyl monomer. Alternatively, the vinyl monomers may be used with a small proportion of an auxiliary liquid monomeric acrylate and/or vinyl ester binder-forming material which is of low volatility and can reduce the hardness and impart a more flexible or resilient character to the final composition. A mixture of a drying oil and an auxiliary monomer may also be used.

Such other acrylic ester monomers include ($C_{10}$–$C_{30}$)alkyl or ($C_{12}$–$C_{30}$)alkenyl acrylates or methacrylates such as lauryl acrylate, myristyl acrylate, palmityl acrylate, oleyl acrylate, linoleyl acrylate, linolenyl acrylate, stearyl acrylate. As stated above, the ($C_8$–$C_{16}$)alkyl acrylates and ($C_8$–$C_{10}$)alkyl methacrylates are preferred. Lauryl methacrylate and isodecyl methacrylate are especially preferred.

Similar improvements in flexibility may be obtained by including the vinyl monomers long chain ($C_{12}$–$C_{30}$)aliphatic acid vinyl esters, e.g., vinyl laurate, vinyl oleate, vinyl stearate or di($C_4$–$C_8$)alkyl esters of maleic acid, fumaric acid, or itaconic acid, e.g., dibutyl, dihexyl, or dioctyl fumarate, maleate, or itaconate; as well as di(meth)acrylates of polyethers such as polyethylene glycol, polypropylene glycol, or polytetramethylene glycol. As stated above, vinyl monomer may also be used with small proportions of multifunctional, i.e., polyethylenically unsaturated, monomers such as polyol (meth)acrylates and polyalkylene polyol(meth)acrylates, such as ethylene glycol diacrylate or dimethacrylate, trimethylolpropane triacrylate or trimethacrylate, triethylene glycol di(meth)acrylate, etc. All of these monomeric materials have low volatility and are polymerizable by the action of the peroxide and the metal salt drier to form products having greater toughness and resistance to water, organic solvents, acids, and alkali. The proportion of these auxiliary monomers, if used, may be from about ½ percent to 40% by weight of the vinyl monomer component, but preferably is not over about 30% by weight of such component.

The invention contemplates the impregnation of already formed articles having a porous surface with the compositions of this invention penetrating at least the outer pores of the surface of such porous articles to make the surface resistant to penetration by such liquids as water, organic solvents, acid, alkalies, and other corrosive liquids. Examples of porous-surfaced materials include portland cement concrete, stone masonry or brick walls, including the facings of the mortar between the bricks and stones, weathered archeological artifacts and wall structures, weathered granite and marble walks and sculptures previously formed and hardened, floors, walls, and ceilings, whether formed of plaster, concrete, cement, wood, pressed boards, pressed metals such as those formed of iron, aluminum, and steel binders, and the like. Impregnation of the surfaces of such articles with the compositions of this invention results in the impartation of a hardened, relatively impermeable surface adapted to resist cracking as well as penetration by means of moisture and other liquids such as those mentioned above. Such impregnation results in rendering the objects resistant to the corrosive and degradative effects caused by weathering and subjection to atmospheric smog resulting from discharges into the air of industrial and internal combustion waste gases, e.g., oxides of sulfur, nitrogen, and carbon, from autos, et al.

The compositions of this invention may be applied to the porous substrate to be coated, impregnated or sealed, by a variety of methods. For example, the composition may simply be poured on the substrate and spread, using, for example, a rubber squeegee, a string mop, a sponge mop or the like. After allowing a sufficient time for penetration to occur, usually a few minutes, excess material may be removed if desired. Alternatively, the composition may be sprayed onto the substrate using airless spray, or spray equipment employing air, nitrogen or some other type of propellant. Several coats of composition may be applied. To some extent, the appropriate method of application and amount of material to be applied is determined by the nature and porosity of the substrate, and can and will be determined by those skilled in the sealer/coating application art.

Whether the compositions of this invention will function when cured as a coating, sealer or impregnant is determined in part by the porosity and nature of the substrate. For example, if the substrate contains macroscopic voids which cannot be filled in their entirety by the composition, then the composition will not function effectively as a sealer when cured. However, even in the case in which the impregnant composition does not function as a sealer when cured, the composition serves to strengthen the porous substrate and increase its resistance to environmental degradation, as, for example, by increasing its resistance to cracking.

When used as polymer concrete, the compositions of this invention may include pigments, fillers, and other materials including aggregates, especially small-sized aggregates.

The aggregate that is mixed with the vinyl monomer can be any material whether capable of curing or not. Examples of inert materials are very small pebbles, sand, or other so-called aggregate materials used in the making of concrete. The sand that may be used may be of any quality or of any size. Sand of small particle size such as "Ottawa" sand and "Best" sand or a mixture of the two may be used to advantage. Ottawa sand is a silica sand of the type referred to as "round." Best sand is of the type known as "sharp". In both cases, fines can be used. In general, however, the sieve size of the sand may vary over a fairly wide range. In lieu of or in addition to sand, it is possible to use ground glass, emery powder, ground slag, very fine gravel, trap rock and similar aggregates.

It is often advantageous to incorporate in the mixture, with or without sand, a minor fraction of clay and/or of a hydraulic cement; if so, the clay may take the form of kaolin, china clay, porcelain clay, fire clay, pipe clay, Bentonite, and, in fact, almost any of the known types of clay. Of course, other materials of small nature may be employed including broken clay products, marble chips, crushed stone, and other typical aggregate materials used in the making of terrazzo floors or walls provided they are small in size in comparison with the pores to be filled. The hydraulic cement that may be employed includes portland cements of the various types: the white cements, the natural cements, pozzolanic cements, cements derived from industrial slags and "fly ash", aluminous cements, and, in general, all of the commercially available hydraulic cements. Also included are hydraulic limes and similar materials of kinds well known to those skilled in the art.

In the following examples, illustrating but a few embodiments of the invention, the parts and percentages are by weight and the temperatures are in Celsius or Centigrade degrees unless otherwise stated.

The following abbreviations are used to designate the corresponding compounds and components:

| | |
|---|---|
| DCPOEMA = | dicyclopentenyloxyethyl methacrylate |
| CHP = | cumene hydroperoxide |
| HEMA = | hydroxyethyl methacrylate |
| HPMA = | hydroxypropyl methacrylate |
| R1 = | Acryloid ®[1] KM-BTA-III-N2 diolefin rubber - prepared from >50% by weight butadiene |
| R2 = | Acryloid KM-330 acrylate copolymer rubber |
| TEGMA = | tetraethyleneglycol dimethacrylate |
| ALMA = | allyl methacrylate |
| DMAB = | N,N—dimethyl amino-para-benzaldehyde |
| 2-EHA = | 2-ethyl hexyl acrylate |
| MMA = | methyl methacrylate |

[1] ACRYLOID is a registered trademark of Rohm and Haas Company.

The following tests are employed to evaluate the physical properties of the cured substrates produced from the compositions of the invention:

Zapon tack test:

Fabrication and calibration of tack tester:

A 1-inch (2.54 cm) wide strip of aluminum (0.00025 inches or 0.0064 cm thick) is cut and bent so that a 1 inch (2.54 cm) square area will rest flat on a tack-free surface when a five gram weight is placed in the center of the area, but fall over with a lighter weight.

Testing for Zero Gram Zapon Tack Free:

The tack tester is placed on the film with no additional weight on the 1 inch square area resting on the film, and restrained from falling over for five seconds as its weight presses down on the film. Then the tester is released. If it falls over within five seconds, the film passes the "zero gram Zapon test".

Testing for 500 Gram Zapon Tack Free:

Similar to the zero gram test except that a 500 gram weight is placed in the center of the 1 inch square area for five seconds, pressing the tester on the film with additional force. The film passes if the tester falls over within five seconds after removing the weight.

Set-to-touch cure test:

The film is judged "set-to-touch" when liquid is not transferred to an object which lightly touches the film. The rubber portion of an eye-dropper is used to touch the film.

Dispersions of rubber particles in vinyl monomer mixtures are prepared by adding the rubber particles to the vinyl monomer with agitation using a propeller mixture, giving opaque but macroscopically uniform, nonsettling dispersions. The following dispersions are prepared (all proportions are by weight):

D1=R1/HPMA/DCPOEMA/TEGMA//15/42.5/21.25/21.25 Brookfield viscosity (spindle No. 2/60 rpm)=59 cps; ICI viscosity=40 cps. (10,000 sec$^{-1}$ shear rate)

D2=R1/HPMA/TEGMA//15/42.5/42.5 Brookfield viscosity (No. 2/60 rpm)=44.5 cps ICI viscosity=30 cps (10,000 sec$^{-1}$ shear rate)

A1=R2/HPMA/DOPOEMA/TEGMA//15/42.5/21.25/21.25 Brookfield viscosity (No. 2/60 rpm)=162,800 cps ICI viscosity=420 cps (10,000 sec$^{-1}$ shear rate)

A2=R2/HPMA/TEGMA//15/42.5/42.5 Brookfield viscosity (No. 4/3 rpm)=1520 cps ICI viscosity=248 cps (10,000 sec$^{-1}$ shear rate).

The dispersions are catalyzed for cure by addition of 0.28 grams cumene hydroperoxide (73%) and either 0.10 or 0.21 grams of 6% cobalt Ten-Cem (Mooney Chemical Co.) per 20.5 grams of dispersion.

The catalyzed dispersions are drawn with a film applicator having an 8 mil gate on Bonderite 1000 pretreated cold rolled steel. Bonderite is a trademark of Parker Rust Proof Co., Detroit, Co. for proprietary surface treatments. Two sets of panels are drawn. Mylar film is placed over one set. All compositions cure rapidly under the Mylar film. Mylar is a trademark of DuPont de Nemours for polyester film. The other set of panels is allowed to cure in air. The following tabulation gives the observations on cure of the latter set of panels.

TABLE I

Effect of Rubber Type on Cure

| Example[1] | 1 | 2 | 3 | 4 | C1[1] | C2 | C3 | C4 |
|---|---|---|---|---|---|---|---|---|
| Dispersion | D1 | D1 | D2 | D2 | A1 | A1 | A2 | A2 |
| Rubber Type | Diene[2] | Diene | Diene | Diene | Acryl.[3] | Acryl. | Acryl. | Acryl. |
| Cobalt Level | High | Low | High | Low | High | Low | High | Low |
| Cure Results | | | | | | | | |
| Set-to-Touch (Days) | 1–3 | 1–3 | 1–3 | 1–3 | >4 | >4 | >4 | >4 |
| Pass Zero Gram Zapon (Days) | 1–3 | 3–4 | 1–3 | 3–4 | Wet films discarded after 4 days. | | | |
| Pass 500 Gram Zapon (Days) | 1–3 | 3–4 | 1–3 | 3–4 | | | | |

[1]Comparative examples are denoted by "C."
[2]"Diene" = diolefin rubber
[3]"Acryl." = acrylate copolymer rubber Each of the samples containing the diolefin rubber cures more quickly than the corresponding acrylic rubber sample. Thus, there is a dramatic promotion of cure by the diolefin rubber relative to the acrylic rubber.

The experiment is repeated, this time with the addition of N,N-dimethylamino-para-benzaldehyde (DMAB) to give 4 parts DMAB to 100 parts vinyl monomer plus dispersed rubber. The catalyzed mixes are then prepared and cast as films. The following tabulation gives the results.

Again, the results in Table II show that the dispersions containing diene rubber give better cure in thin films. This experiment also shows that the slow cure is due to air inhibition (note short pot life of catalyzed mixes when not cast as thin films), and that the level of cobalt is important for the cure in air with the diene rubber dispersions.

In a study of binder compositions for polymer concrete composed of DCPOEMA, HPMA, and lauryl methacrylate, the following binder compositions are particularly slow in surface cure using prior art cure systems without diolefin rubber:

| Component | Experimental Binder No. | |
|---|---|---|
| | 6 | 8 |
| | Percent (wt.) of Binder | |
| Lauryl methacrylate | 50 | 69 |
| HPMA | 0 | 23 |
| DCPOEMA | 50 | 8 |

Diolefin rubber is an additive in a set of experiments designed to improve surface cure. The results, tabulated below in Table III, show the dramatic response with 5 or 10 parts per hundred monomer in surface cure at room temperature.

TABLE II

Effect of Rubber Type on Cure - Accelerated Catalyst

| Example[1] | 5 | 6 | 7 | 8 | C5 | C6 | C7 | C8 |
|---|---|---|---|---|---|---|---|---|
| Dispersion | D1 | D1 | D2 | D2 | A1 | A1 | A2 | A2 |
| Rubber Type | Diene[2] | Diene | Diene | Diene | Acryl.[3] | Acryl. | Acryl. | Acryl. |
| Cobalt Level | High | Low | High | Low | High | Low | High | Low |
| Cure Results | | | | | | | | |
| Pot Life (Minutes) | 12 | 11 | 12 | 10 | 9 | 8 | 10 | 7 |
| Film Cure at 18 hours | Set-to-touch | Not completely Set | Set-to-touch | Not completely Set | Wet | Wet | Wet | Wet |

[1]Comparative examples are denoted by "C.".
[2]"Diene" = diolefin rubber.
[3]"Acryl." = acrylic copolymer rubber

TABLE III

Effect of Diolefin Rubber on Cure of Flexibilized Systems

| Example | Initiator Type/ Level[2] | Cobalt[6] Type/ Level[2] | DMAB Level[2] | Other Additive PHM[3] | Total Monomer[7] % by weight | Surface Cure[8] (Days at Temperature) Binder | | Bulk Cure[9] (Min. at RT) Binder | |
|---|---|---|---|---|---|---|---|---|---|
| | | | | | | No. 6 | No. 8 | No. 6 | No. 8 |
| C9[1] | BPO 1 | 4142 1 | 1 | — | 15 | >4 days at 70 C. | >4 days at 70 C. | 251 | 123 |

TABLE III-continued

| | | | | | | | | | | |
|---|---|---|---|---|---|---|---|---|---|---|
| C10 | BPO 2 | 4142 1 | 1 | — | 15 | >1 day at 70 C. | >1 day at 70 C. | 145 | 90 |
| C11 | BPO 2 | 4142 1 | 1 | — | 12 | 1 day at 70 C. (float tacky) | 1 day at 70 C. | 120 | 75 |
| C12 | BPO 2 | 4142 1 | 2 | — | 15 | >3 days at 70 C. | >3 days at 70 C. | 85 | 60 |
| C13 | BPO 3 | 4142 1 | 1 | — | 15 | >3 days at 70 C. | >3 days at 70 C. | 90 | 45 |
| C14 | BPO 1 | 4142 1 | 3 | — | 15 | not run | >1 day at RT | — | 75 |
| | | | | Diolefin rubber[4] | | | | | |
| 9 | BPO 2 | 4142 1 | 1 | 5 | 12 | 4 hours at RT | 4 hours at RT | 100 | 70 |
| 10 | BPO 2 | 4142 1 | 1 | 10 | 12 | 1 day at RT | 1 day at RT | 100 | 70 |
| 11 | BPO 2 | 4142 1 | 1 | 2 | 12 | >1 day at RT | >1 day at RT | 100 | 70 |
| | | | | DMPT[5] | | | | | |
| C15 | BPO 2 | 4142 1 | 1 | 0.5 | 15 | >1 day at RT | >1 day at RT | 17 | 10 |
| C16 | CHP 1 | AcAc 1 | 1 | — | 15 | >4 days at 70 C. | >4 days at 70 C. | 189 | 172 |
| C17 | CHP 1 | AcAc 2 | 1 | — | 15 | >1 day at 70 C. | >1 day at 70 C. | 145 | 170 |

[1] Comparative examples are denoted by "C."
[2] "Level" indicates the number of multiples of arbitrary standard amount.
For BPO initiator this is 4 PHM of Cadox BFF-50 (50% active BPO).
Cadox is a trademark of Cadet Chemical Co.
For CHP initiator this is 4 PHM of solution (73% active CHP).
For cobalt acetylacetonate (AcAc) this is 0.13 PHM of cobalt metal.
For Catalyst 4142 (solid grade of cobalt neodecanoate) this is 0.13 PHM of cobalt metal.
[3] PHM = part per hundred parts monomer
[4] Diolefin rubber = R1 (added as mixture with filler), PHM
[5] DMPT = N,N—dimethyl-para-toluidine, PHM
[6] Cobalt AcAc = Cobalt acetyl acetonate
Catalyst 4142 = Solid grade of cobalt neodecanoate.
[7] Total Monomer = Percent of polymer concrete formulation as monomer, remainder of polymer concrete formulation is filler and other additives
Filler:  #2 mesh sand    41 wt. %
         #45 mesh sand   41 wt. %
         Silica flour    17.5 wt. %
         Pigment         0.5 wt. %.
[8] Surface cure time determined by time to tack-free surface.
[9] Bulk cure time determined by time to hardening of polymer concrete in thick section.

In another experiment, dispersions of diolefin acrylic rubbers are prepared in HPMA, adding the particulate elastomers to the HPMA while agitating with a propeller-type agitator. The dispersions are 40 solid elastomer/60 HPMA (wt.). The diene rubber is R1. The acrylate rubber is R3, an emulsion polymer prepared with 5.6 weight % seed, 73.6 2-EHA/0.8 ALMA//19.4 MMA/0.6 ALMA, and isolated as a powder by freeze-drying.

A 10% dispersion of Thixatrol ST thickener in DCPOEMA is prepared on a Cowles disperser (Thixatrol ST is a hydrogenated castor oil derivative designed to impart thixotropic flow properties). Thixatrol is a trademark of Baker Castor Oil Co.

Mixtures of the above dispersions with HPMA, DCPOEMA, 6% Cobalt Ten-Cem (Mooney Chemical), and cumene hydroperoxide (73% active) are prepared, using 0.4 grams 6% cobalt and 0.4 grams cumene hydroperoxide per 20 grams of HPMA+dispersions+DCPOEMA. The mixtures are drawn with a casting block having a 20 mil (0.05 cm) gate on Bonderite 1000 pretreated cold rolled steel. The panels are weighed before and immediately after drawing the films. The panels are reweighed at various times after casting. The weight loss is primarily a measure of the HPMA lost from the film by volatilization. Films having slower rates of cure will lose more weight during cure.

Table IV shows binder compositions and weight loss data.

TABLE IV

Weight Loss of Diolefin Rubber/Vinyl Monomer Compositions

| Example[1] | C18[1] | 12 | C19 | 13 | C20 |
|---|---|---|---|---|---|
| Component | Weight percent before CHP, cobalt. | | | | |
| HPMA | 50 | 50 | 50 | 50 | 50 |
| DCPOEMA | 47 | 27 | 27 | 37 | 37 |
| Thixatrol ST | 3 | 3 | 3 | 3 | 3 |
| R1 | — | 20 | — | 10 | — |
| R3 | — | — | 20 | — | 10 |
| Time after Drawing Film (hours) | Weight loss from Panel (% of initial film weight) | | | | |
| 1 | 0.24 | 0.38 | 0.74 | 0.47 | 0.53 |
| 2 | 1.10 | 1.39 | 2.03 | 1.41 | 1.49 |
| 3 | 1.97 | 1.95 | 2.91 | 2.15 | 2.32 |
| 4 | 3.03 | 2.21 | 4.00 | 2.80 | 3.58 |
| 5 | 3.75 | 2.22 | 4.70 | 3.00 | 3.97 |
| 19–19.5 | 6.22 | 1.66 | 14.05 | 2.93 | 9.13 |
| 26.5–27 | 6.37 | 1.69 | 24.09 | 2.86 | 10.70 |

[1]Comparative examples are denoted by "C."

The diolefin rubber gives dramatic improvement of film cure when replacing DCPOEMA, while the acrylate rubber gives poorer film cure.

Decorative Coatings

Polymer concrete compositions may be used as decorative coatings for exterior surfaces such as concrete block, portland cement, brick and the like. Such decorative coatings are often pigmented to achieve a desired aesthetic effect. One problem encountered with pigmented decorative coatings prepared from polymer concrete compositions in the past has been chalking and fading of the color on the coating surface. Pigmented polymer concrete prepared with the vinyl monomer compositions of the present invention are useful as decorative coatings. In order to compare the fade resistance of the compositions of this invention with those of the prior art, the change in Delta E is measured by the Hunter color comparison test, after exposing the panels in a preliminary screening test related to durability. The screening test employs a 24 hour exposure in a fog box. See *Paint Testing Manual,* ASTM Publication 500 (G. Sward Ed.) Chapter 1 and *Paint/Coatings Dictionary,* Fed. Soc. Coatings Tech. 222-223, 292-293, for an explanation of the Hunter equation and the color difference test. The vinyl monomer mixture employed has the following composition:

| | |
|---|---|
| DCPOEMA | 50 parts by weight |
| HPMA | 50 parts by weight |
| DMAB | 4 parts by weight |

The aggregate "dry mix" for the polymer concrete has the following composition:

| | Parts by Weight |
|---|---|
| # 2 mesh sand | 40.2 |
| # 45 mesh sand | 40.2 |
| Silica flour | 17.0 |
| White Pigment (Titanium Dioxide) | 0.5 |
| Red Pigment (Red Iron Oxide) | 1.2 |
| Cadox BFF-50 (50% Benzoyl Peroxide) in plasticizer | 0.7 |
| Catalyst 4142 (solid grade of cobalt neodecanoate, 11.2% Co) | 0.2 |

The dry mix and the monomer mixture are mixed by weight in the proportions indicated in Table V below. In the case of Examples 14, 16, and 17, the R1 diolefin rubber powder is dispersed in the monomer mixture prior to mixing with the dry mix. In the case of Example 15, the R1 diolefin rubber is added to the monomer as an emulsion (the powder form is typically produced by drying such an emulsion). The polymer concrete is applied to mild steel panels ("Q" panels from Q-Panel Corporation) at thickness of about 1/16 inch by spreading with a spatula. The panels are allowed to cure for 3 days in the laboratory, then 13 days on the roof of the laboratory.

Cured panels are exposed in a fog box for 64 hours. The quantity Delta E is measured for each panel prior to and subsequent to exposure. The change in Delta E is reported in Table V below.

TABLE V

| Effect of Diolefin Rubber on Polymer Concrete Fade Resistance | | | | | |
|---|---|---|---|---|---|
| Example[1] | 14 | 15 | 16 | 17 | C21 |
| Polymer concrete composition (percent by weight) | | | | | |
| Monomer mixture[2] | 12.0 | 13.5 | 13.5 | 14.25 | 15.0 |
| Diolefin rubber (R1) Powder | 3.0 | 0 | 1.5 | 0.75 | 0 |
| Diolefin rubber - 31% solids emulsion | 0 | 1.5[3] | 0 | 0 | 0 |
| Dry mix | 85 | 85 | 85 | 85 | 85 |
| Change in Delta E[4] | 4.66 | 7.15 | 9.21 | 10.57 | 13.71 |

[1]Comparative examples are denoted by "C".
[2]The composition of the monomer mixture is given above.
[3]Diolefin rubber R1 was used as emulsion in water rather than powder derived from drying the emulsion.
[4]Calculated using the Hunter Color Difference Equation from color differences measured using a Model b25b24 color difference meter manufactured by Hunter Lab.

The results reported in Table V indicate that the vinyl monomer compositions of the present invention yield polymer concrete with superior color fade resistance.

I claim:

1. A vinyl monomer composition exhibiting improved cure in an oxygen-containing environment comprising (1) a deinhibiting amount of diolefin rubber dispersed in monomer comprising at least one low volatility vinyl monomer having a partial pressure less than about 1 millimeter of mercury at 50° C., (2) a multifunctional monomer selected from the group consisting of diacrylates, triacrylates, dimethacrylates, and (3) a catalyst consisting of at least one polyvalent cobalt salt, wherein (a) said diolefin rubber is polymerized in at least two stages including an initial stage and a subsequent stage, said initial stage comprising polymerizing a diolefin monomer selected from the group consisting of 1,3-butadiene, 2-chloro-1,3-butadiene, 2,3-dichloro-1,3-butadiene, 2-cyano-1,3-butadiene, 1,2,3,4,-tetrachlorobutadiene, isoprene, 1,4,-hexadiene and dicyclopentadiene, and said subsequent stage comprising polymerizing a monomer selected from the group of consisting of styrene, methyl methacrylate and ($C_2$–$C_8$)alkyl acrylate, and (b) said diolefin rubber is insoluble in said vinyl monomer.

2. The composition of claim 1 wherein said diolefin rubber is dispersed as diolefin rubber particles.

3. The composition of claim 2 wherein said diolefin rubber particles are polymerized from monomer comprising at least about 60 percent by weight of total monomer of diolefin monomer selected from 1,3-butadiene, 2-chloro-1,3-butadiene, 2,3-dichloro-1,3-butadiene, 2-cyano-1,3-butadiene, 1,2,3,4-tetrachlorobutadiene, isoprene and dicyclopentadiene.

4. The composition of claim 3 wherein said diolefin rubber particles are polymerized from monomer comprising at least about 50% by weight of 1,3-butadiene.

5. The composition of claim 3 wherein the initial stage is polymerized by emulsion polymerization.

6. The composition of claim 1 wherein at least one of the initial and subsequent stages additionally comprise from about 0.01 to 5 percent by weight of a divinyl crosslinking agent based on the total weight of monomer which is polymerized during said stage.

7. The composition of claim 6 wherein said divinyl crosslinking agent is selected from divinyl benzene, diethylene glycol dimethacrylate, triethylene glycol dimethacrylate, tetraethylene glycol dimethacrylate, polyethylene glycol dimethacrylate, polypropylene glycol dimethacrylate and 1,3-butylene glycol dimethacrylate.

8. The composition of claim 2 wherein the weight ratio of said diolefin rubber particles to said vinyl monomer is from about 1:20 to 1:1.

9. The composition of claim 8 wherein the weight ratio of said diolefin rubber particles to said vinyl monomer is from about 1:9 to 1:4.

10. The composition of claim 2 wherein the ratio of the weight of diolefin monomer polymerized to yield said diolefin rubber particles to the total weight of monomers polymerized to yield said particles is at least about 0.4.

11. The composition of claim 1 wherein said vinyl monomer comprises at least one dicyclopentenyl monomer selected from the dicyolopentenyloxy($C_2$–$C_6$)alkyl acrylates and methacrylates and dicyclopentenyl acrylate and methacrylate.

12. The composition of claim 1 wherein said component 1) additionally comprises at least one hydroxyalkyl monomer selected from the hydroxy($C_1$–$C_4$)alkyl acrylates and methacrylates.

13. The composition of claim 1 wherein said component 1) additionally comprises at least one flexibilizing monomer selected from the ($C_8$–$C_{16}$)alkyl acrylates and methacrylates.

14. The composition of claim 11 wherein said dicyclopentenyl monomer is selected from dicyclopentenyloxyethyl methacrylate, dicyclopentenyl acrylate and dicyclopentenyl methacrylate.

15. The composition of claim 12 wherein said hydroxyl alkyl monomer is selected from hydroxyethyl methacrylate and hydroxypropyl methacrylate.

16. The composition of claim 1 wherein said multifunctional monomer is tetraethyleneglycol dimethacrylate.

17. The composition of claim 13 wherein said flexibilizing monomer is selected from lauryl methacrylate and isodecyl methacrylate.

18. The composition of claim 1 additionally comprising a polymerization catalyst dispersed in said vinyl monomer, wherein said polymerization catalyst comprises at least one free radical initiator.

19. The composition of claim 18 wherein said polymerization catalyst additionally comprises at least one cure promoter selected from para-dimethylaminobenzaldehyde and N,N-dimethyl-para-toluidine.

20. The composition of claim 18 wherein said free radical initiator is selected from cumene hydroperoxide and benzoyl peroxide.

21. The composition of claim 1 wherein said polyvalent metal catalyst is selected from cobalt naphthenate cobalt octoate and cobalt acetylacetonate.

22. The composition of claim 19 wherein said cure promoter is para-dimethylaminobenzaldehyde.

23. A fade resistant decorative coating composition comprising colorant pigment and the vinyl monomer composition of claim 1.

* * * * *